United States Patent
Baughman et al.

(10) Patent No.: US 10,138,376 B2
(45) Date of Patent: Nov. 27, 2018

(54) REDUCED TRACKING, REDUCED CURING TIME ASPHALT EMULSION AND METHOD OF MAKING AND USING SAME

(71) Applicant: Textile Rubber & Chemical Company, Inc., Dalton, GA (US)

(72) Inventors: Arthur Barry Baughman, Dalton, GA (US); Joseph Charles English, II, Ringgold, GA (US)

(73) Assignee: TexTile Rubber and Chemical Company, Inc., Dalton, GA (US)

( * ) Notice: Subject to any disclaimer, the term of this patent is extended or adjusted under 35 U.S.C. 154(b) by 65 days.

(21) Appl. No.: 15/197,070

(22) Filed: Jun. 29, 2016

(65) Prior Publication Data

US 2018/0002528 A1 Jan. 4, 2018

(51) Int. Cl.
| | |
|---|---|
| *C08L 95/00* | (2006.01) |
| *C04B 26/26* | (2006.01) |
| *C09D 195/00* | (2006.01) |
| *E01C 7/24* | (2006.01) |
| *E01C 7/18* | (2006.01) |
| *C04B 111/00* | (2006.01) |

(52) U.S. Cl.
CPC ............ *C08L 95/005* (2013.01); *C04B 26/26* (2013.01); *C09D 195/005* (2013.01); *E01C 7/185* (2013.01); *E01C 7/24* (2013.01); *C04B 2111/0075* (2013.01); *C08L 2201/52* (2013.01); *C08L 2555/80* (2013.01)

(58) Field of Classification Search
CPC .. C08L 95/00; C08L 2555/80; C08L 2201/52; C08L 2201/50; C08L 2201/54; C09D 195/00; C04B 26/26; E01C 7/00; E01C 7/185; E01C 7/24
See application file for complete search history.

(56) References Cited

U.S. PATENT DOCUMENTS

| | | | |
|---|---|---|---|
| 5,296,264 A | 3/1994 | Blacklidge et al. | |
| 5,503,871 A | 4/1996 | Blacklidge et al. | |
| 6,706,787 B1 * | 3/2004 | Burris | C08L 95/005 524/59 |
| 7,503,724 B2 | 3/2009 | Blacklidge | |
| 7,918,624 B2 | 4/2011 | Blacklidge | |
| 8,764,340 B2 | 7/2014 | Campbell | |
| 8,968,457 B2 | 3/2015 | Payne | |
| 2007/0141241 A1 * | 6/2007 | Blacklidge | C08L 95/005 427/138 |
| 2016/0333183 A1 | 11/2016 | Murthy et al. | |

\* cited by examiner

*Primary Examiner* — Jennifer A Smith
*Assistant Examiner* — Alexandra M Moore
(74) *Attorney, Agent, or Firm* — Robert E. Richards; Richards IP Law

(57) ABSTRACT

The invention comprises a product comprising a continuous phase comprising water and a discontinuous phase comprising an asphalt composition and a vinyl acetate-ethylene copolymer. A method for using the composition is also disclosed.

14 Claims, No Drawings

REDUCED TRACKING, REDUCED CURING TIME ASPHALT EMULSION AND METHOD OF MAKING AND USING SAME

FIELD OF THE INVENTION

The present invention generally relates to asphalt emulsions. More particularly, the present invention relates to an asphalt emulsion tack coat for bonding together an existing substrate layer, which is usually an asphaltic composition, and an asphaltic pavement layer. Specifically, this invention relates to asphalt emulsions that have the properties of reduced tack, reduced tracking and reduced curing time after they are applied to a substrate. The present invention also relates to a method of making and using the asphalt emulsion.

BACKGROUND OF THE INVENTION

Many roads, highway, driveways, parking lots and similar structures are paved with an asphaltic composition. Asphaltic pavement is generally made from aggregate, such as rock, shells, recycled pavement materials and other similar materials, and a binder material containing asphalt, tar and other binder materials, as well as various additives, fillers and the like.

In constructing pavement structures with one or more asphaltic layers, it is often necessary to lay each asphaltic layer down on a preceding pavement layer in a predetermined sequence, with a bonding material between the layers. The bonding material, which also may be referred to as a tack coat, acts to provide a degree of adhesion or bonding between the layers, and in some instances, may fuse the layers together. The tack coat also acts to reduce slippage and sliding of the layers relative to other layers in the pavement structure during use or due to wear and weathering of the pavement structure.

Pavement and road surfaces also require regular maintenance to repair normal wear and tear of the roadway due to vehicular or pedestrian traffic, the effect of weather and environmental conditions, and other factors. In some applications, all or a portion of the traffic bearing surface may be removed through grinding, stripping or other means, and a new pavement layer is applied to the prepared structure. In other applications, a new pavement layer is placed down on top of the existing pavement structure to provide a new or renewed traffic-bearing surface. To prepare such preexisting pavement structures for application of an additional, new pavement layer, a tack coat often is applied to the preexisting pavement surface to facilitate the adhesion and/or fusion of the new pavement material with the preexisting surface and/or structure.

A bonding or tack coat also may be applied to a base or substrate layer in advance of the application of the next pavement layer. During such process, construction or other vehicles are expected to travel over the tack coat without significantly damaging or reducing the effectiveness of the coating. Such damage often occurs, however, when the bonding or tack coating is picked up on the tires or tracks of vehicles traveling over the coated surface. Where this occurs, the asphalt compositions often are tracked onto other pavement surfaces causing disruption to the surrounding area. This tracking also reduces the effectiveness of the tack coat by displacing a portion of the intended coating volume from the area awaiting a new pavement layer.

U.S. Pat. Nos. 7,503,724 and 7,918,624 to Blacklidge et al. (the disclosures of which are both incorporated herein by reference) disclose the generally accepted industry practice for applying a tack coat of an asphalt emulsion between adjacent asphalt pavement layers. Blacklidge et al. discloses a tack coat emulsion comprising a first phase, which includes an asphalt composition and a second phase comprising water and emulsifying and stabilizing additives. The first phase of the emulsion comprises hard pen asphalt of about 30% to about 70% by weight of the total emulsion. The asphalt has a pen value of about 5 dmm to about 15 dmm. The second phase of the emulsion comprises 30% to 70% of the total weight of the total emulsion. The second phase also includes emulsifiers, stabilizers and other additives comprising about 0.1% to about 3% by weight of the total emulsion. Other additives are disclosed by Blacklidge et al. as "common polymers such as EVA, SBS, SB, SBR, SBR latex, waxes, polychloroprene, isoprene, polybutadiene, acrylic and acrylic copolymers, carbon reinforced elastomers, ground tire rubber, and/or other elastomers and plastomers to assist in obtaining desired breaking rates for the emulsion and adhesion of the asphalt emulsion residue." Blacklidge et al. discloses that its product is applied to paving substrate layers or asphalt base layers to improve adhesion and to reduce slippage of adjacent layers. Blacklidge et al. also discloses that the cured tack coat has the property of reduced tracking. The tack coat emulsion is applied at ambient temperatures or at a temperature of about 140 to about 180° F. Blacklidge et al. discloses that the tack coat emulsion dries in about 5 to about 30 minutes and cures in about 30 minutes to about one hour. Heated asphalt paving material is then applied on top of the cured tack coat to form an asphalt pavement layer.

U.S. Pat. No. 8,764,340 to Campbell (the disclosure of which is incorporated herein by reference) discloses a trackless tack coat emulsion. Campbell's emulsion comprises asphalt, water and an anionic emulsifying agent to provide an anionic asphalt emulsion. The asphalt emulsion is applied at a temperature of approximately 110 to 160° F.

U.S. Pat. No. 8,968,457 to Payne (the disclosure of which is incorporated herein by reference) discloses a cationic asphalt tack coat material. Payne's tack coat emulsion comprises asphalt, water, a latex polymer, sodium chloride, muriatic acid and a surfactant wherein the composition is a cationic emulsion. The asphalt emulsion is applied at a temperature of 160° F. as a tack coat. Payne does not disclose what polymer is used for the latex in his asphalt emulsion.

Blacklidge et al., Campbell and Payne all purport to provide compositions having reduced tracking compared to the prior art process of applying a liquefied asphalt composition, which included solvents and/or volatile oils, such as naphthas or kerosenes. However, those prior art tack coating materials are not truly trackless. It would therefore be desirable to provide an improve tack coat emulsion having reduced tracking properties and rapid drying and curing.

DETAILED DESCRIPTION OF THE DISCLOSED EMBODIMENTS

A tack coat is a thin bituminous liquid asphalt, emulsion, or cutback layer applied between pavement layers to promote bonding. The tack coat is sticky, an attribute that makes it ideal for use as an adhesive between adjacent layers of asphalt. Without the presence of a tack coat, a new layer of asphalt laid upon an existing road would deteriorate much more quickly, often creating potholes and various conditions that decrease the safety of the road.

The tack coats typically used in the construction of asphaltic pavement structures are asphalt-containing compositions that are prepared as a liquid, flowable fluid so that they can be effectively and efficiently applied and spread over a prepared base course or pavement surface. Such asphalt bonding compositions can be liquefied in several ways, such as heating above the melt temperatures, dissolution into solvents or volatile oils to form cutback asphalt compositions and by emulsification with water. In the case of cutback asphalt composition, the cutback becomes "cured" as solvents evaporate leaving the desired asphalt compositions. The release of such solvents into the atmosphere is clearly environmentally undesirable.

To provide suitable bonding tack coatings must provide an adhesive tacky surface after the composition, emulsion, or coating is cured to bond and/or fuse the pavement and base layers. The asphalt materials available for use in tack coats are commercially available in different properties based on their viscosity, solids content, chemical composition, and other characteristics. One grade measure is the penetration or "pen" value.

The pen value is based on the penetration testing where the relative hardness of the asphalt composition is determined at a predetermined temperature, typically 77° F. (25° C.). One test uses methods such as those described in ASTM D5 (ASTM International) and AASHTO T49 (American Association of State Highway and Transportation Officials). This test measures the distance in dmm (tenth of a millimeter) that a standard needle, under a standard load, will penetrate a sample in a given time under known temperature conditions. The resulting distance is often referred to as the penetration or "pen" value.

Another common measure of an asphalt composition is the Ring and Ball Softening Point. This softening point test using methods such as those described in ASTM D36 and/or AASHTO T53 measures the temperature at which an asphalt composition becomes soft and flowable. As used herein, pen values and softening point values are with reference to the above-identified ASTM and AASHTO methods or their equivalents.

Although not formally defined, typically hard (i.e., high melt point) asphalt compositions have pen values of about 40 dmm or less with softening points greater than about 140° F. (60° C.). Such compositions are often referred to as hard pen or low pen asphalt compositions. Asphalt compositions with pen values between about 40 dmm to about 100 dmm and with softening points between about 118° F. (48° C.) and about 140° F. (60° C.), are typically referred to as medium, mid, or moderate pen asphalt compositions. Asphalt compositions with pen values greater than 100 dmm and with softening points less than 118° F. (48° C.) are typically referred to as soft or high pen asphalt compositions.

The asphalt compositions often used to form asphalt emulsions for the purpose of forming tack coats typically are soft or medium pen asphalt products. They typically have pen values greater than 40 dmm and softening points less than 140° F. (60° C.). When applied as a tack coat, emulsions using such soft or medium pen asphalt compositions typically provide a relatively sticky, tacky surface under ambient temperature conditions in pavement construction environments. As a result, such tack coats experience significant tracking problems and may not provide a durable bond between paving surfaces particularly at elevated temperatures.

As a result, cutback asphalts, asphalt emulsions using mid to soft pen asphalts, and mid to soft pen asphalts alone are commonly employed as tack coats for bonding asphaltic pavement materials to preexisting pavements, intermediate pavement courses and base courses in new construction. Cutback asphalt tack coats typically included asphalt residues in excess of 60% by weight of the total product combined with solvents such as naphthas, kerosenes, oils or other such products to maintain the asphalt composition in a liquid, flowable condition. The conventional asphalt emulsions typically included products with asphalt residues in a range from about 25% to 70% by weight of the total product or greater.

A number of difficulties, however, limit the utility of cutback asphalts and conventional asphalt emulsions made with moderate or soft pen asphalt compositions. Some such products can require relatively long cure times (as long as 2 to 7 days or more) before traffic is permitted to pass over the treated area. Where the next pavement layer cannot be laid down immediately, the cured tack coat remains exposed for extended periods and remains tacky and sticky. Accordingly, vehicle traffic over the treated surfaces often must be prohibited until another layer of pavement is applied, and if traffic is allowed on the treated surfaces, the asphalt tack coating frequently adheres to the tires and tracks of vehicles traveling over the coated surfaces.

Damage to the tack coating can substantially interfere with the ability of the coating to properly bond and/or fuse the pavement layers or base together. This type of damage also may permit water penetration into the pavement surface, which can result in further deterioration due to freeze-thaw cycles or similar stresses. As a result, multiple applications of a tack coat may be required to obtain the desired adhesion between the pavement layers at a significant loss of efficiency and increase in cost. Furthermore, where the coatings are tracked to other surfaces by contaminated vehicles, extensive cleanup may be required adding to the expense of a project.

In addition, the use of conventional asphalts for tack coats often requires equipment adapted to maintain those products at an elevated temperature throughout the application procedure. Such equipment is often expensive to operate and difficult to maintain which increases the cost and reduces the efficiency of the asphalt tack coat. In addition, as it relates to cutback asphalt products specifically, they contain volatile solvents that can damage the environment and are released into the atmosphere during the curing process. These volatile solvents in asphalt cutbacks further present safety issues during their storage and application. As a result, cutback asphalt products are, or could become, prohibited from general use in many states.

Tracking is defined as residual asphalt that sticks to the surface of vehicle tires as they cross the tack coat treated surface and deposits the picked up tack coat on adjacent clear surfaces, such as a clean roadway. Low tracking is very important where rapid adhesion is necessary. Examples include high traffic areas where there is minimal traffic control or where there is heavy truck traffic.

When asphalt is milled into microscopic particles and dispersed in water with a chemical emulsifier it becomes an asphalt emulsion. The tiny droplets of asphalt remain uniformly suspended until the emulsion is used for its intended purpose. In the emulsion state, the emulsifier molecules orient themselves in and around droplets of asphalt. The chemistry of the emulsifier/asphalt/water systems determines the dispersion and the stability of the suspension. When emulsions are used in the field, the water evaporates into the atmosphere and the chemical emulsifier is retained with the asphalt. Asphalt emulsions are classified into three categories: anionic, cationic and nonionic. The anionic and cationic classes refer to the electrical charges surrounding the suspended asphalt particles.

The present invention provides an improved asphalt emulsion to obtain a high performance, tack coat application resulting in reduced tack, minimal tracking, rapid curing and excellent bonding to an existing substrate layer or a pavement layer. The improved asphalt emulsion of the present invention results in a strong adhesive bond coat provided by a polymer modified asphalt emulsion.

The asphalt emulsion of the present invention comprises an asphalt emulsion and a polymer emulsion additive. In a disclosed embodiment of the present invention, the asphalt emulsion comprises about 30% to about 70% by weight asphalt, about 30% to about 70% by weight water and about 0.1% to about 10% by weight polymer additive based on the total weight of the emulsion. In a preferred embodiment of the present invention, the asphalt emulsion comprises about 40% to about 70% by weight asphalt, about 30% to about 60% by weight water and about 0.1% to about 10% by weight polymer additive based on the total weight of the emulsion. In an especially preferred embodiment of the present invention, the asphalt emulsion comprises about 40% to about 70% by weight asphalt, about 30% to about 60% by weight water and about 1% to about 5% by weight polymer additive based on the total weight of the emulsion.

The asphalt emulsion of the present invention can be cationic, anionic or nonionic; however, nonionic asphalt emulsions are rarely used for paving applications. For a cationic asphalt emulsion, the asphalt emulsion additionally comprises about 0.2% to about 1% by weight based on the total weight of the emulsion cationic surfactant emulsifier and sufficient acid to adjust the pH of the emulsion to about 1.0 to about 2.0, preferably a pH of about 1.4 to about 1.8. The acid is preferably muriatic acid. Cationic surfactant emulsifiers useful in the present invention are well known in the art and are commercially available, for example, REDI-COTE® E-4819 available from Akzo Nobel Surface Chemistry LLC, Chicago, Ill. The emulsion is a cationic emulsion that has a rapid curing time similarly to NTSS-1HM but being cationic has a positive charge.

For an anionic asphalt emulsion, the asphalt emulsion additionally comprises about 0.2% to about 0.5% by weight based on the total weight of the emulsion anionic surfactant emulsifier and sufficient base to adjust the pH of the emulsion greater than 11, preferably a pH of about 11 to about 12. The base is preferably sodium hydroxide. Anionic surfactant emulsifiers useful in the present invention are well known in the art and are commercially available, for example, MeadWestvaco® M-28B available from MeadWestvaco Corp., Charleston, S.C. The emulsion is an anionic emulsion that has a rapid curing time similarly to NTSS-1HM.

The asphalt emulsion preferably is prepared from a base asphalt having a penetration of greater than 40 dmm to about 100, dmm more preferably with penetration of about 50 dmm to about 100 dmm. The asphalt preferably has a Superpave grade of PG-67-22 or above, typically referred to as medium, mid, or moderate pen asphalt.

The asphalt emulsion preferably is optimized to provide stability during production, storage, transportation and application; to provide a fast drying emulsion that cures in 10 to 60 minutes, and dries to a reduced track coating. The optimization of an asphalt emulsion is known to those skilled in the art.

The polymer additive is a vinyl acetate-ethylene copolymer (VAE). VAE copolymers are comprised of about 60% to about 95% by weight vinyl acetate monomer and about 5% to about 40% by weight ethylene monomer. VAE should not be confused with ethylene vinyl acetate copolymer (EVA) which are generally comprised of about 10% to about 40% by weight vinyl acetate monomer and 60% to 90% by weight ethylene monomer. VAE copolymers are prepared as water-based emulsions. VAE emulsions offer considerable performance advantages over poly(vinyl acetate) PVAc homopolymers, due to the ability to alter the glass transition temperature (Tg ° C.) through the incorporation of the ethylene monomer. As the ethylene content increases, the Tg decreases. In contrast to PVAc, VAE polymerization utilizes high-pressure reactions, ranging between 200 and 2000 psi. In contrast, ethylene plasticizes PVAc by increasing the flexibility of the polymer backbone. Both effects result in a lowering of the Tg of the final copolymer. In addition, VAE copolymers possess enhanced toughness, flexibility and serviceability.

A preferred VAE emulsion for use in the present invention is UP 10330 available from Ultrapave Corp., Dalton, Ga. UP 10330 is a high solid, low viscosity vinyl acetate and ethylene co-polymer aqueous polymer dispersion with a solids content of 62.5% to 64% (EN ISO 3251), a viscosity of 200 to 800 mPa·s (DIN EN ISO 2555), a pH of 6 to 7.5 (DINISO 976), a glass transition temperature (Tg) of 2 to 8° C. and a minimum film forming temperature of 0° C. (DIN ISO 2115), that is stabilized using systems that promote compatibility with asphalt emulsions.

For combining the asphalt emulsion and the VAE emulsion, the VAE emulsion can merely be combined with the asphalt emulsion and mixed together. Alternatively, for a cationic asphalt emulsion, the VAE aqueous emulsion is added to the water, surfactant and acid solution prior to milling through a colloid mill or injected into the water, surfactant and acid solution line prior to milling through a colloid mill. The production procedure for a cationic asphalt emulsion is known to those skilled in the art. Alternatively, for an anionic asphalt emulsion, the VAE aqueous emulsion is added to the water, surfactant and base solution prior to milling through a colloid mill or injected into the water, surfactant and base solution line prior to milling through a colloid mill. The production procedure for an anionic asphalt emulsion is known to those skilled in the art.

The asphalt emulsion of the present invention can be prepared in advance of its application or at a work site immediately before its application. Alternatively, a concentrate of the asphalt emulsion of the present invention can be mixed with water at a rate sufficient to produce the desired final emulsion concentration on a continuous basis during the application step using metering and mixing equipment known to those skilled in the art.

The pavement surface receiving the tack coat should be clean and dry to promote maximum bonding. Emulsified tack coat materials can be applied to cool and/or damp pavement; however, the length of time needed for the set to occur may increase. Since existing and milled pavements can be quite dirty and dusty, their surfaces should be cleaned off by sweeping or washing before any tack coat is placed, otherwise, the tack coat material may bond to the dirt and dust rather than the underlying pavement layer. This can result in excessive tracking of the tack coat material. Construction vehicles and equipment pick up the tack coat-dirt mixture on their tires and leave the existing roadway with little or no tack coat in the wheel paths. Slippage cracking and delamination are distresses typically seen when pavement cleanliness is lacking before application of a tack coat.

The reduced track tack coat of the present invention provides a durable low tack surface capable of resisting damage from vehicle traffic or other sources. The reduced track tack coat of the present invention further softens, and partially liquefies, when contacted by heated paving materials as such paving materials are applied to the coating and substrate. At these elevated temperatures, the reduced tracking tack coat of the present invention is sufficiently adhesive to bond asphalt containing or other pavement layers together in a pavement structure. The bond between the pavement layers increases in strength as the structure cools below the asphalt softening point as the reduced track tack coat re-hardens. One advantage of the present invention is that it is believed that the bond formed by the reduced track tack coat in accordance with the present invention is significantly stronger than the bond provided by prior art tack coats.

The asphalt emulsion, the emulsion application rate, and the amount of applied emulsion is effective to form a reduced track tack coat that adheres and/or fuses asphaltic material to a roadway base or substrate. The asphaltic composition of the asphalt phase and any additives are selected so that the asphalt emulsion cures in about 5 minutes to about one hour, preferably about 15 minutes to about 45 minutes, more preferably about 5 to about 15 minutes. The cure rate will depend on the application rate, dilution ratios used, base course conditions, weather conditions (i.e., surface temperature, wind, humidity, exposure to direct sunlight) and other similar considerations. If the prepared pavement surface or base course contains excess moisture, the curing time of the tack coat of the present invention may be increased.

In a disclosed embodiment of the present invention, the asphalt emulsion of the present invention is applied at a rate of from about 0.01 to about 0.20 gallons per square yard (0.045 to 0.9 liters per square meter), preferably from about 0.04 to 0.08 gallons per square yard, (0.18 l to 0.36 liters per square meter). In another disclosed embodiment of the present invention, the asphalt emulsion of the present invention is applied in multiple passed over the substrate layers at lower rates to achieve a comparable product, where the total application rate is equal to the sum of the multiple passes and is from about 0.01 to about 0.20 gallons per square yard (0.045 to 0.90 liters per square meter). The rate of application of the asphalt emulsion of the present invention can vary depending on the specific application conditions, composition of the emulsion, the surface to which it is applied, and the nature of the permanent materials and/or base that comprise the pavement structure and the like.

In a disclosed embodiment of the present invention, the substrate layers can include soil, clay, sand, shell cement, limestone, fly ash or mixtures thereof. In another disclosed embodiment of the present invention, the substrate layers comprise hot mix asphalt layers, a preexisting paving surface, or a scraped, ground, or scored paving surface. The asphalt emulsion of the present invention is applied to a surface that is substantially free from all foreign matter.

The storage temperature of the asphalt emulsion of the present invention is preferably about 125 to about 185° F. (50-85° C.). This promotes product uniformity of the asphalt emulsion, and decreases sieve development and flow of the product, without causing excessive evaporation of the water component. During storage, the asphalt emulsion of the present invention should not be heated above a maximum temperature of approximately 185° F. (85° C.).

The asphalt emulsion of the present invention is preferably applied to a substrate by brush, squeegee, or spray equipment and should yield coverage rates as previously discussed. Preferably, the tack coat of the present invention should remain dry until it has cured. The tack coat of the present invention, when applied at proper rates, will have a reduced track surface within approximately 10 minutes and will be rain proof within about 30 to about 60 minutes, preferably within about 30 minutes. As used in this application, "rain proof" means that the tack coat of the present invention does not re-emulsify if additional water, such as rain, is added. In a preferred embodiment, the tack coat of the present invention can be applied when the ambient air temperature is not less than about 33° F. and rising.

The asphalt emulsion of the present invention is preferably applied at a temperature of about 140° F. (60° C.) to about 180° F. (82° C.), more preferably from about 165° F. (74° C.) to about 175° F. (80° C.). Alternatively, the asphalt emulsion of the present invention can be applied at ambient temperature (e.g., about 68° F. to about 77° F. (about 20° C. to about 25° C.), which may affect the curing time of the tack coat. The asphalt emulsion of the present invention preferably is placed directly on top of an exposed surface of an existing prepared surface or base course and is allowed to cure before traffic passes over the coated surface or an additional layer of pavement is applied to the treated surface.

Upon placement of a new hot mix asphalt, or warm mix asphalt, on the tack coat of the present invention, heat from the new asphalt mix layer will liquefy residual high-modulus asphalt tack and an excellent bond will be formed between the existing and new asphalt mix course. The heat radiating from the new asphalt mix will re-liquefy the cured tack coat, thereby forming a bond between the pre-existing substrate and the new asphalt mix course.

After the tack coat of the present invention is cured, traffic can be permitted to pass over the roadway or paving materials may then be applied to the base course. The tack coat of the present invention creates a durable, reduced tack surface, and as such it restricts tracking to other surfaces via vehicle tires or treads.

In a preferred embodiment, the asphalt emulsion of the present invention can be used as provided or may be diluted with additional water. The diluted asphalt emulsion of the present invention when diluted with additional water, in addition to being used as a reduced track tack coat, can be used as a fog seal over hot mix asphalt, warm mix asphalt, chip seal, slurry seal, micro surfacing, micro surfaced pavement, and concrete pavements.

The following examples are illustrative of selected embodiments of the present invention and are not intended to limit the scope of the invention. All percentages are by weight and all temperatures are ° F., unless otherwise noted.

Example 1

An asphalt emulsion in accordance with the present invention is prepared. A PG 67-22 asphalt is used as the base asphalt. The asphalt emulsion contains 61.3% by weight asphalt (Saybolt Viscosity at 77° F. of 22 SFS, Storage Stability after 24 hours of 0.3% and 0.01% sieve), 4.5% by weight VAE emulsion (UP 10330) based on the total weight of the emulsion. A cationic surfactant and muriatic acid are also present. The pH of the asphalt emulsion is 1.37. The asphalt has a penetration of 55 dmm and a softening point of 126° F. The properties of a disclosed embodiment of the asphalt emulsion of the present invention are shown in Tables I and II below. The test protocols are those described by the referenced standards published by ASTM International ("ASTM"); the American Association of State Highway and Transportation Officials ("AASHTO") and the Federal Highway Administration ("FHWA").

TABLE I

EMULSION PROPERTIES

| Property | Test | Minimum | Maximum | Material |
|---|---|---|---|---|
| Saybolt Furol Viscosity Seconds @ 77° F. (25° C.) | ASTM D7496 AASHTO T59 | 20 | 100 | 22 |
| Storage Stability 24 hrs, % by mass | ASTM D6930 AASHTO T59 | | 1 | 0.3 |
| Residue by Distillation % by Mass | ASTM D6997 AASHTO T59 | 55 | | 61.3 |
| Sieve Test % by mass | ASTM D6933 AASHTO T59 | | 0.15 | 0.01 |

TABLE II

REDUCED TRACK TACK PROPERTIES

| Property | Test | Minimum | Maximum | Material |
|---|---|---|---|---|
| Penetration 77° F. (25° C.) 100 g, 5 sec. dmm | ASTM D5 AASHTO T49 | 40 | 100 | 55 |
| R&B Softening Point Range, ° F. | ASTM D36 AASHTO T53 | 118 | | 126 |

Example 2

2000 gallons of the asphalt emulsion disclosed in Example 1 above are supplied to a contractor for a blind trial on an existing highway. The ambient temperature is 65-70° F. during the trial. The asphalt emulsion is applied at a temperature of 140° F. at an application rate of 0.05 gallons per square yard on existing pavement and an application rate of 0.075 gallons per square yard on pavement that has previously been ground smooth. On both surfaces, the tack coat cures black in 5 minutes and is trackless in 7 minutes.

It should be understood, of course, that the foregoing relates only to certain disclosed embodiments of the present invention and that numerous modifications or alterations may be made therein without departing from the spirit and scope of the invention.

What is claimed is:

1. An emulsion comprising:
   a continuous phase comprising water; and
   a discontinuous phase comprising an asphalt composition and a vinyl acetate-ethylene ("VAE") copolymer, wherein the vinyl acetate-ethylene copolymer comprises about 60% to about 95% by weight vinyl acetate monomers and about 5% to about 40% by weight ethylene monomers and wherein when the emulsion is cured, the cured asphalt composition has a penetration value of about 50 dmm to about 100 dmm and wherein the asphalt composition has a softening point of about 118 to less than 140° F.

2. The emulsion of claim 1, wherein the discontinuous phase comprises approximately 30% to approximately 70% by weight asphalt composition and approximately 0.1% to approximately 10% by weight vinyl acetate-ethylene copolymer based on the total weight of the emulsion.

3. The emulsion of claim 1, wherein the discontinuous phase comprises approximately 40% to approximately 70% by weight asphalt composition and approximately 1% to approximately 5% by weight vinyl acetate-ethylene copolymer based on the total weight of the emulsion.

4. The emulsion of claim 1, wherein the discontinuous phase comprises approximately 60% by weight asphalt composition and approximately 4.5% by weight vinyl acetate-ethylene copolymer based on the total weight of the emulsion.

5. The emulsion of claim 1, wherein the continuous phase further comprises an emulsifying agent and a stabilizing agent.

6. The emulsion of claim 1, wherein the asphalt composition has a softening point of about 118 to about 126° F.

7. A method for bonding a layer of asphalt pavement material to a substrate, the method comprising:
   applying to an exposed surface of a substrate layer an aqueous emulsion comprising:
      a continuous phase comprising water; and
      a discontinuous phase comprising an asphalt composition and a vinyl acetate-ethylene ("VAE") copolymer, wherein the vinyl acetate-ethylene copolymer comprises about 60% to about 95% by weight vinyl acetate monomers and about 5% to about 40% by weight ethylene monomers; and
   allowing the aqueous emulsion to cure, wherein the cured asphalt composition has a penetration value of about 50 dmm to about 100 dmm and wherein the asphalt composition has a softening point of about 118 to less than 140° F.

8. The method of claim 7 further comprising applying a heated asphalt pavement material to the emulsion-coated substrate surface.

9. The method of claim 7, wherein the discontinuous phase comprises approximately 30% to approximately 70% by weight asphalt composition and approximately 0.1% to approximately 10% by weight vinyl acetate-ethylene copolymer based on the total weight of the emulsion.

10. The method of claim 7, wherein the discontinuous phase comprises approximately 40% to approximately 70% by weight asphalt composition and approximately 1% to approximately 10% by weight vinyl acetate-ethylene copolymer based on the total weight of the emulsion.

11. The method of claim 7, wherein the discontinuous phase comprises approximately 40% to approximately 70% by weight asphalt composition and approximately 1% to approximately 5% by weight vinyl acetate-ethylene copolymer based on the total weight of the emulsion.

12. The method of claim 7, wherein the continuous phase further comprises an emulsifying agent and a stabilizing agent.

13. The method of claim 7, wherein the aqueous emulsion is allowed to cure for a time sufficient to provide a reduced tracking surface before the heated asphalt pavement material is applied to the emulsion-coated substrate surface.

14. The method of claim 7, wherein the substrate surface is an asphalt pavement surface.

* * * * *